United States Patent
Nishi et al.

(10) Patent No.: US 10,456,921 B2
(45) Date of Patent: Oct. 29, 2019

(54) INDUSTRIAL-ROBOT CONTROL DEVICE

(71) Applicant: FANUC CORPORATION, Yamanashi (JP)

(72) Inventors: Hiroji Nishi, Yamanashi (JP); Shunichi Ozaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 97 days.

(21) Appl. No.: 15/832,281

(22) Filed: Dec. 5, 2017

(65) Prior Publication Data

US 2018/0178392 A1 Jun. 28, 2018

(30) Foreign Application Priority Data

Dec. 27, 2016 (JP) .................. 2016-253949

(51) Int. Cl.
| | |
|---|---|
| B25J 13/00 | (2006.01) |
| B25J 9/16 | (2006.01) |
| B25J 19/06 | (2006.01) |
| G05B 19/414 | (2006.01) |

(52) U.S. Cl.
CPC .............. B25J 13/003 (2013.01); B25J 9/16 (2013.01); B25J 9/1694 (2013.01); B25J 19/06 (2013.01); G05B 19/414 (2013.01); G05B 2219/37337 (2013.01)

(58) Field of Classification Search
CPC ........ B25J 13/003; B25J 9/1694; B25J 19/06; B25J 9/16; G05B 19/414; G05B 2219/37337
See application file for complete search history.

(56) References Cited

U.S. PATENT DOCUMENTS

| | | | |
|---|---|---|---|
| 5,280,622 A | 1/1994 | Tino | |
| 6,947,893 B1 | 9/2005 | Iwaki et al. | |
| 9,604,361 B2* | 3/2017 | Gustafsson | ............ B25J 9/1656 |
| 9,623,559 B2* | 4/2017 | Linnell | ................. B25J 9/1671 |
| 2003/0069669 A1 | 4/2003 | Yamaura | |
| 2004/0133312 A1* | 7/2004 | Watanabe | ............. B25J 13/003 |
| | | | 700/264 |
| 2005/0125099 A1* | 6/2005 | Mikami | ................. G06N 3/008 |
| | | | 700/245 |
| 2006/0020467 A1 | 1/2006 | Iwaki et al. | |
| 2006/0153390 A1 | 7/2006 | Iwaki et al. | |

(Continued)

FOREIGN PATENT DOCUMENTS

| | | |
|---|---|---|
| CN | 105058389 A | 11/2015 |
| CN | 105843081 A | 8/2016 |

(Continued)

OTHER PUBLICATIONS

Office Action dated Jul. 17, 2018 in corresponding Japanese Application No. 2016-253949; 6 pages.

(Continued)

*Primary Examiner* — Jason Holloway
(74) *Attorney, Agent, or Firm* — Maier & Maier, PLLC

(57) ABSTRACT

Provided is an industrial-robot control device including a microphone attached to an industrial robot, a specific-sound detector that detects a specific sound from a sound picked up by the microphone, and a controller that allows the industrial robot to operate only during a period in which the specific sound is detected by the specific-sound detector.

4 Claims, 3 Drawing Sheets

(56) References Cited

U.S. PATENT DOCUMENTS

| | | |
|---|---|---|
| 2009/0157406 A1 | 6/2009 | Iwaki et al. |
| 2010/0011939 A1 | 1/2010 | Nakadai et al. |
| 2010/0017034 A1 | 1/2010 | Nakadai et al. |
| 2011/0054691 A1* | 3/2011 | Lee .................. A01M 29/06 700/259 |
| 2011/0144829 A1* | 6/2011 | Kim .................. A01M 29/10 701/2 |
| 2011/0176683 A1 | 7/2011 | Iwaki et al. |
| 2012/0283747 A1* | 11/2012 | Popovic ............. A61B 34/30 606/130 |
| 2015/0343635 A1* | 12/2015 | Linnell ............. B25J 9/1671 700/249 |
| 2017/0305009 A1 | 10/2017 | Jiang |
| 2019/0022860 A1* | 1/2019 | Kishi .................. B25J 13/00 |

FOREIGN PATENT DOCUMENTS

| | | |
|---|---|---|
| JP | S62-165209 A | 7/1987 |
| JP | S62-192890 U | 12/1987 |
| JP | H06-175714 A | 6/1994 |
| JP | H06-320457 A | 11/1994 |
| JP | 2000-202790 A | 7/2000 |
| JP | 2001-239485 A | 9/2001 |
| JP | 2001-246174 | 9/2001 |
| JP | 2001-284431 A | 10/2001 |
| JP | 2003-117865 A | 4/2003 |
| JP | 2006-289514 A | 10/2006 |
| JP | 2008-049462 A | 3/2008 |
| JP | 2010-026512 A | 2/2010 |
| JP | 2010-162619 A | 7/2010 |
| JP | 2015-221468 A | 12/2015 |
| WO | 2017/098713 A1 | 6/2017 |

OTHER PUBLICATIONS

Search Report dated Jul. 10, 2018 in corresponding Japanese Application No. 2016-253949; 16 pages.

Chinese Office Action dated Apr. 2, 2019, in connection with corresponding CN Application No. 201711396983.5 (11 pgs., including English translation).

* cited by examiner

INDUSTRIAL-ROBOT CONTROL DEVICE

CROSS-REFERENCE TO RELATED APPLICATIONS

This application is based on Japanese Patent Application No. 2016-253949, the content of which is incorporated herein by reference.

TECHNICAL FIELD

The present invention relates to industrial-robot control devices suitable for controlling industrial robots.

BACKGROUND ART

In the related art, robots are wired for emergency stoppages so that the robots in an operating state can be stopped in emergency situations. As an alternative to such wiring for stopping a robot in an emergency, Patent Literature 1 discloses a feature wherein a robot is stopped in an emergency when a specific sound is detected.

CITATION LIST

Patent Literature

{PTL 1}
Japanese Unexamined Patent Application, Publication No. 2010-162619

SUMMARY OF INVENTION

An aspect of the present invention provides an industrial-robot control device including a microphone attached to an industrial robot; a specific-sound detector that detects a specific sound from a sound picked up by the microphone; and a controller that allows the industrial robot to operate only during a period in which the specific sound is detected by the specific-sound detector.

DESCRIPTION OF EMBODIMENTS

An industrial-robot control device according to an embodiment of the present invention will be described below with reference to the drawings.

Figure 1:
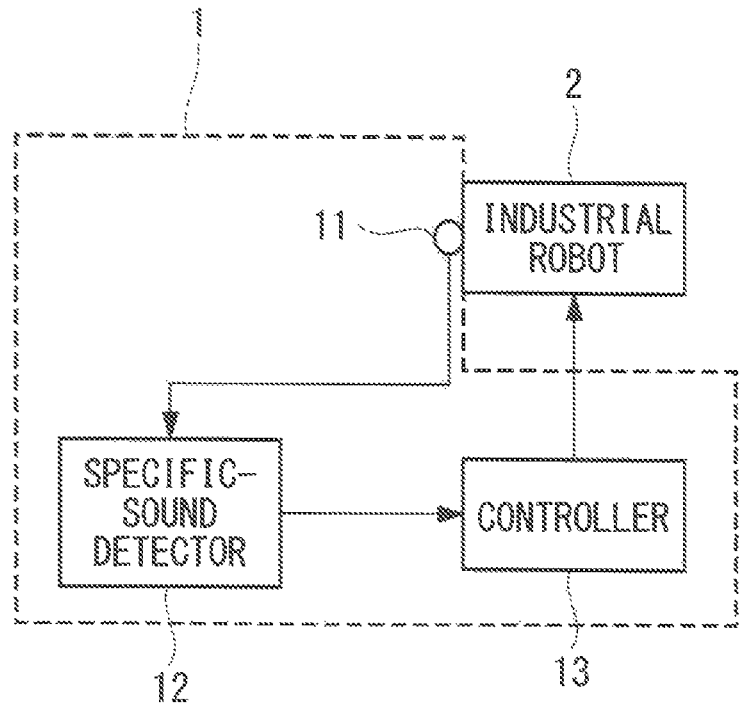
FIG. 1 is a block diagram schematically illustrating the configuration of an industrial-robot control device according to an embodiment of the present invention.

As shown in FIG. 1, an industrial-robot control device 1 includes a microphone 11, a specific-sound detector 12, and a controller 13. The specific-sound detector 12 is connected to the microphone 11 and the controller 13. The controller 13 is connected to the specific-sound detector 12 and also to an industrial robot 2.

The industrial-robot control device 1 also includes a processor (not shown), main storage units, such as a read-only memory (ROM) and a random access memory (RAM), an auxiliary storage unit, such as a hard disk drive (HDD), and an external interface for exchanging various types of data with an external device. The auxiliary storage unit stores programs for realizing various functions to be described below. The processor loads a program from the auxiliary storage unit into one of the main storage units so as to execute the program.

The industrial-robot control device 1 is connected to the industrial robot 2 and controls the industrial robot 2.

The microphone 11 is attached to the industrial robot 2 and picks up external sound.

The specific-sound detector 12 receives an electrical signal converted from the sound picked up by the microphone 11. Based on this electrical signal, the specific-sound detector 12 detects a specific sound from the sound picked up by the microphone 11 and transmits the detection result to the controller 13. Normally, the specific sound is played back by a speaker-equipped playback device installed in advance in a factory. The playback device is connected to a stop button, and an operator may press this stop button to stop the playback of the specific sound.

The specific sound is set in advance in the industrial-robot control device 1. Examples of the specific sound include "normal sound of a nearby machine", "sound of a forklift truck approaching", "acoustic waves outside the audible range", "sound with a specific pattern", "music", "speech", and a combination of the above.

The "acoustic waves outside the audible range" are acoustic waves of 20 Hz or lower or 20 kHz or higher. Although sound can reach a farther destination as its frequency decreases, it is necessary to obtain a good balance between the two since the sound may cause unpleasantness to a person serving as an operator.

Examples of the "sound with a specific pattern" include a sinusoidal sound, a square wave sound, a sweep sound, a sound whose frequency changes in accordance with a predetermined pattern, white noise, pink noise (i.e., noise whose power is inversely proportional to its frequency), a sound that is created in view of the A scale (i.e., frequency weighting characteristics in view of the human auditory sense) and that is less likely to be heard by humans, and a sound that carries a sine wave with a specific frequency based on amplitude modulation, like an AM wave, or frequency modulation, like an FM wave.

The specific sound can be detected by using various known methods. In order to detect the specific sound, deep learning, specifically, a deep neutral network, may be used. Moreover, noise reduction processing may be performed as pre-processing for detecting the specific sound.

Figure 2A:
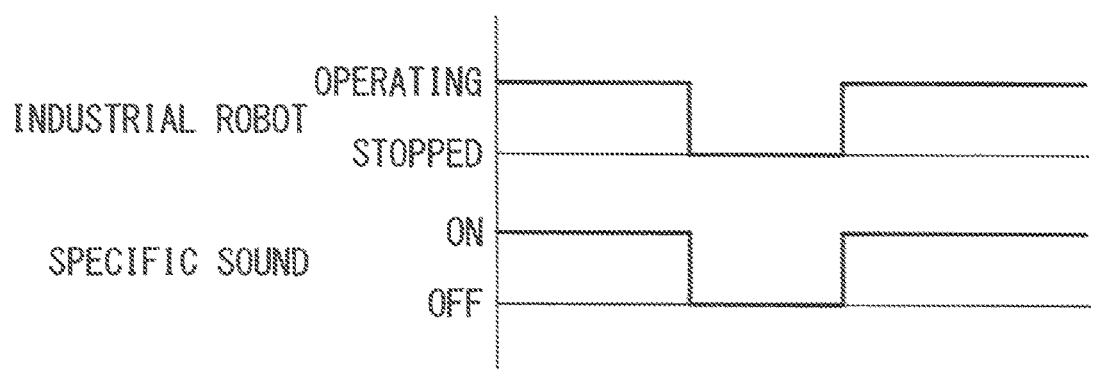
FIG. 2A illustrates a timing chart of an industrial robot controlled by the industrial-robot control device in FIG. 1 and includes a timing chart (a) corresponding to a case where the industrial robot operates based on a specific sound.

The controller 13 receives the specific-sound detection result from the specific-sound detector 12 and controls the operation of the industrial robot 2 based on the detection result. Specifically, as shown in FIG. 2A, the controller 13 allows the industrial robot 2 to operate only during a period in which a specific sound is detected by the specific-sound detector 12, that is, during a period in which the controller 13 determines that a specific sound is in an ON state.

Furthermore, the controller 13 stops the operation of the industrial robot 2 only during a period in which a specific sound is not detected by the specific-sound detector 12, that is, a period in which the controller 13 determines that a specific sound is in an OFF state. When a specific sound is detected by the specific-sound detector 12, that is, when the controller 13 determines that a specific sound is in an ON state, the controller 13 allows the industrial robot 2 to resume its operation.

Accordingly, by setting the specific sound to, for example, the aforementioned "normal sound of a nearby machine", the industrial robot 2 is allowed to operate only when a nearby machine is properly operating.

Moreover, by setting the specific sound to the aforementioned "sound of a forklift truck approaching", the industrial robot 2 is allowed to perform a preparatory operation for receiving a component to be conveyed by the forklift truck.

By using, as the specific sound, a musical composition that is expected to have a good effect on the operator, such as a musical composition by Mozart, or a sound that the operator may enjoy, such as the sound from a radio, improvements in the working environment or mental health can be expected.

Figure 2B:
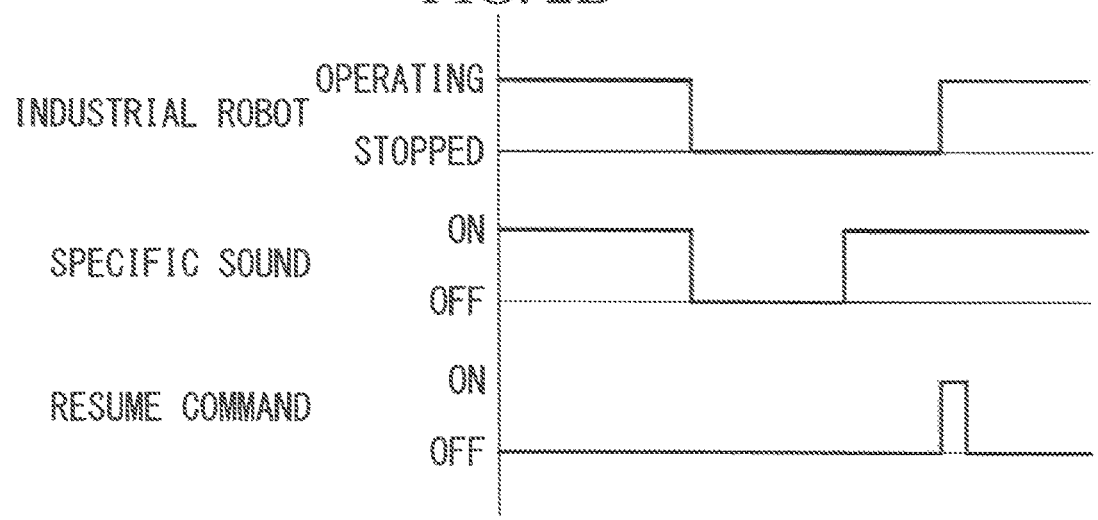
FIG. 2B illustrates a timing chart of an industrial robot controlled by the industrial-robot control device in FIG. 1 and includes a timing chart (b) corresponding to a case where the industrial robot operates based on a specific sound and a resume command.

As the timing for causing the industrial robot 2 to start operating, the controller 13 may cause the industrial robot 2 to resume its operation when the controller 13 determines that the specific sound is in an ON state and a resume command serving as a trigger is turned on, as shown in FIG. 2B.

The resume command is a signal to be input to the controller 13 from an input unit (not shown) included in the industrial-robot control device 1. For example, the input unit includes an input button.

The operation of the industrial robot 2 controlled by the industrial-robot control device 1 will be described below with reference to FIGS. 3A and 3A.

Figure 3A:
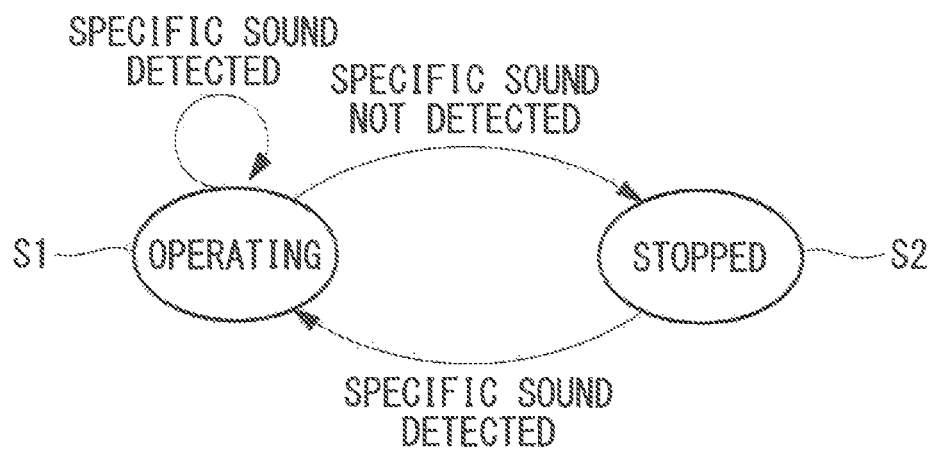
FIG. 3A is a state transition diagram of the industrial robot controlled by the industrial-robot control device in FIG. 1.

As shown in FIG. 3A, the industrial robot 2 is in an operating state S1 during a period in which the controller 13 determines that a specific sound is detected by the specific-sound detector 12. When the controller 13 determines that a specific sound is not detected by the specific-sound detector 12, the operational state of the industrial robot 2 changes from the operating state S1 to a stopped state S2. Then, when the controller 13 determines that a specific sound is detected by the specific-sound detector 12, the operational state of the industrial robot 2 changes from the stopped state S2 to the operating state S1.

Accordingly, in a case where the controller 13 determines that a specific sound is not detected, the operational state of the industrial robot 2 is always changed to the stopped state S2. Therefore, when the playback of the specific sound by the playback device is stopped, the industrial robot 2 stops operating.

In the industrial-robot control device 1 according to this embodiment, it is not necessary to prepare wiring for stopping the industrial robot 2 in emergency situations, thereby facilitating the installation of the industrial robot 2. Moreover, if there are a plurality of industrial robots 2 near a speaker, the plurality of industrial robots 2 can be stopped concurrently.

Furthermore, if the acoustical environment is poor due to the effect of, for example, ambient noise and it is not possible to detect a specific sound even through the specific sound is being played back by the playback device, the operational state of the industrial robot 2 changes to the stopped state S2. This can prevent a misoperation in which the industrial robot 2 continues to operate.

Figure 3B:
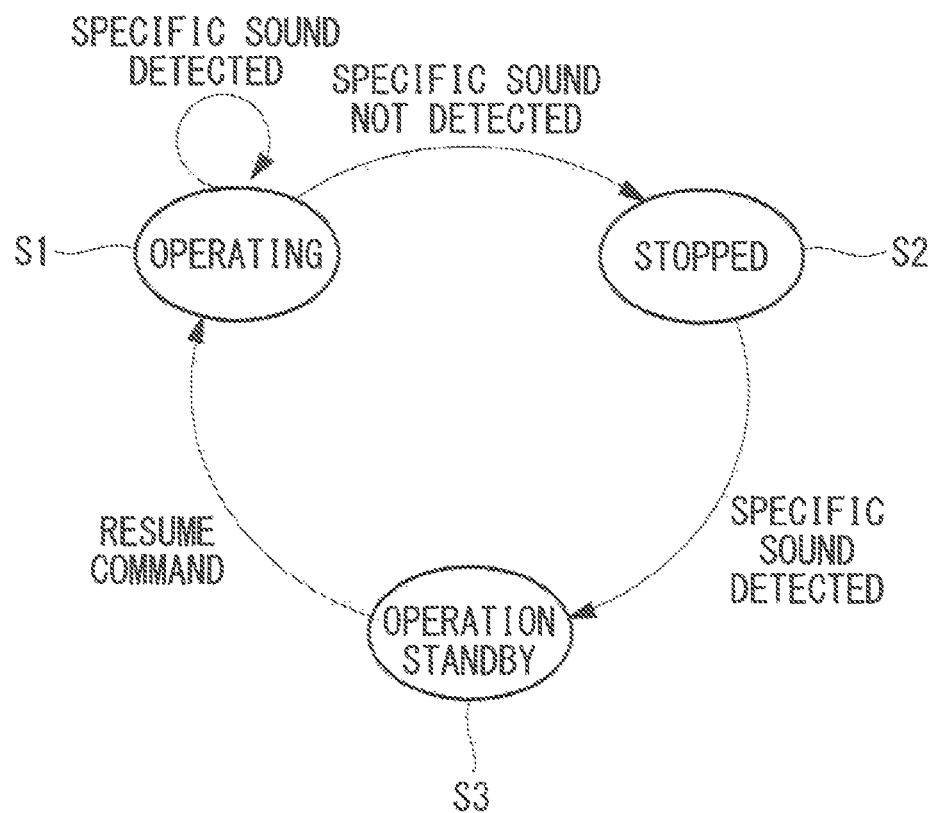
FIG. 3B is a state transition diagram of the industrial robot controlled by the industrial-robot control device in FIG. 1.

When the operational state of the industrial robot 2 is to be changed from the stopped state S2 to the operating state S1, an operation standby state S3 may be provided between the stopped state S2 and the operating state S1, as shown in FIG. 3B.

In this case, when the industrial robot 2 is in the stopped state S2 and the controller 13 determines that a specific sound is detected by the specific-sound detector 12, the operational state of the industrial robot 2 changes from the stopped state S2 to the operation standby state S3. Then, when a resume command is input to the controller 13 during the operation standby state S3, the operational state of the industrial robot 2 changes to the operating state S1. Accordingly, a misoperation of the industrial robot 2 can be prevented.

Although the embodiment of the present invention has been described above in detail with reference to the drawings, the specific configuration is not limited to that in the embodiment, and design modifications are included so long as they do not depart from the scope of the invention.

For example, in the above-described embodiment, the above-described functions of the specific-sound detector 12 and the controller 13 included in the industrial-robot control device 1 are implemented by causing the processor to execute the program. Alternatively, the functions may be implemented in the form of hardware, such as a circuit on a silicon chip.

As a result, the above-described embodiment leads to the following aspect.

An aspect of the present invention provides an industrial-robot control device including a microphone attached to an industrial robot; a specific-sound detector that detects a specific sound from a sound picked up by the microphone; and a controller that allows the industrial robot to operate only during a period in which the specific sound is detected by the specific-sound detector.

According to this configuration, the sound is picked up by the microphone attached to the industrial robot, and the specific sound is detected from the picked-up sound by the specific-sound detector. Then, the controller allows the industrial robot to operate only during the period in which the specific sound is detected.

Accordingly, control for allowing or not allowing the industrial robot to operate is performed based on the specific sound, so that an emergency stoppage can be readily realized without preparing emergency-stoppage wiring for the industrial robot.

If the specific sound is not detected due to, for example, ambient noise, the industrial robot is not allowed to operate. Thus, the industrial robot can be reliably stopped when desired, regardless of the ambient noise.

In the industrial-robot control device according to the above aspect of the present invention, the specific-sound detector may detect specific music as the specific sound.

In the industrial-robot control device according to the above aspect of the present invention, the controller may cause the industrial robot to stop operating when the specific sound is not detected, and may cause the industrial robot to resume operation when the specific sound is detected again.

In the industrial-robot control device according to the above aspect of the present invention, the controller may cause the industrial robot to stop operating when the specific sound is not detected, and may cause the industrial robot to resume operation when the specific sound is detected again and a command for causing the industrial robot to resume the operation is input.

The present invention is advantageous in that it can readily realize emergency stoppage of an industrial robot and can also reliably stop the industrial robot when desired, regardless of ambient noise.

REFERENCE SIGNS LIST

1 industrial-robot control device
2 industrial robot
11 microphone
12 specific-sound detector
13 controller

The invention claimed is:

1. An industrial-robot control device comprising:
a microphone attached to an industrial robot; and
a processor comprising a controller and a specific sound detector, the processor configured to:
detect, by the specific sound detector, a specific sound from a sound picked up by the microphone; and
activate the industrial robot from a stopped state to an operation state when the specific sound is detected by the specific-sound detector and changing the industrial robot from the operation state to a stopped state when the specific sound is not detected.

2. The industrial-robot control device according to claim 1, wherein the detecting of the specific sound detects specific music as the specific sound.

3. The industrial-robot control device according to claim 1,
wherein the activating of the industrial robot causes the industrial robot to stop operating when the specific sound is not detected, and causes the industrial robot to resume operation when the specific sound is detected again.

4. The industrial-robot control device according to claim 1,
wherein the activating of the industrial robot causes the industrial robot to stop operating when the specific sound is not detected, and causes the industrial robot to resume operation when the specific sound is detected again and a command for causing the industrial robot to resume the operation is input.

* * * * *